United States Patent Office 2,904,398
Patented Sept. 15, 1959

2,904,398
PRODUCTION OF INORGANIC FLUORINE COMPOUNDS

William Channing Smith, Wilmington, Del., assignor to E. I. du Pont de Nemours and Company, Wilmington, Del., a corporation of Delaware No Drawing. Application June 7, 1957
Serial No. 664,163

13 Claims. (Cl. 23—88)

This invention relates to a new process for preparing fluorine compounds. In particular, it refers to a new process for preparing inorganic fluorides of metals with atomic numbers no greater than 83.

Inorganic fluorides of metals are well known compounds which range from high-melting salt-like products with ionic bonds to volatile liquid or gaseous products in which the bonds are primarily nonionic or covalent in character. Because of the wide diversity in properties, they are finding increasing application in many fields, such as public health, pest control, catalysts for organic reactions, polymerization catalysts, fibers preservatives, mordants for dyeing and intermediates for production of organic fluorine compounds. Specifically, they can be utilized in the manufacture of fluorocarbons as described in U.S. Patents 2,709,186, 2,709,187, 2,709,188 and 2,709,190.

Although some inorganic fluorides occur in nature in the form of minerals, frequently in combination with other inorganic salts, many of them have to be prepared artificially. Present synthetic methods usually employ elemental fluorine or hydrogen fluoride, both of which are corrosive and difficult to handle, frequently reacting with exceptional and occasionally uncontrollable vigor.

An object of this invention is, consequently, to provide a general method of synthesizing the fluorides of metals of atomic number no greater than 83.

A further object is provision of a general process for synthesizing fluorides of such elements which avoids the use of elemental fluorine and hydrogen fluoride.

In the furtherance of the above-mentioned and yet other objects, inorganic fluorides or, in some instances, oxyfluorides are prepared by contacting sulfur tetrafluoride with an inorganic compound which consists of at least one metal of atomic number no greater than 83, oxygen, and not more than one other nonmetal, that nonmetal being fluorine. In these compounds the metals are bonded solely to oxygen, or to oxygen and fluorine when the latter is present.

The division of elements into metals and nonmetals is well recognized in modern chemistry. It is discussed, for example, in Deming's "General Chemistry" (John Wiley and Sons, Inc., 5th ed., Chapter 11) and in Morgan and Burstall's "Inorganic Chemistry—A Survey of Modern Development" (W. Heffer and Sons, Ltd., pp. 18–19). The metals, according to the periodic table in Deming's "General Chemistry," are the elements of groups I, II, VIII, III–B, IV–B, V–B, VI–B, VII–B and the elements in groups III–A, IV–A, V–A and VI–A which have atomic numbers above 5, 14, 33 and 52, respectively.

In one embodiment of the invention, sulfur tetrafluoride is contacted with a binary compound which is an oxide of a metal of atomic number no greater than 83, i.e., a compound consisting of oxygen and one metal of atomic number no greater than 83, the metal being bonded solely to oxygen. The preferred group in this embodiment of the invention is the binary oxides of metals of atomic numbers 22 through 51 of groups IV–A, V–A, IV–B through VII–B and VIII of the periodic table. The oxides of these elements are preferred because of availability, smoothness of reaction with sulfur tetrafluoride and usefulness of the fluorides obtained in the process. In an especially preferred embodiment of the invention, the oxides of metals which have atomic numbers of 22 through 51 and which are found in groups IV and V are used. Partially fluorinated oxides, i.e., oxyfluorides, can be substituted for the binary oxides in this embodiment of the invention.

The inorganic oxides can be employed in pure form or as physical mixtures of two or more oxides of the metals defined above. Examples of oxides suitable for the process of this invention are sodium peroxide, magnesium oxide, zirconium oxide, tantalum oxide, manganese dioxide, cobalt oxide, palladium oxide, copper oxide, cadmium oxide, gallium oxide, stannic oxide and antimony oxide. Examples of physical mixtures are oxides of alkali and alkaline earth metals with oxides of zinc or aluminum, for example, calcium oxide and aluminum oxide.

In a second embodiment of the invention, sulfur tetrafluoride is contacted with an inorganic compound or ternary oxide containing oxygen and two metals in which the metals are of atomic number no greater than 83 and are bonded only to oxygen. Fluorine may again be substituted for part of the oxygen in the starting materials. Compounds which exemplify this embodiment of the invention are potassium chromate, potassium permanganate, sodium molybdate, sodium bismuthate and zinc chromate. In this embodiment of the invention, compounds in which one of the metals is an alkali or alkaline earth metal are preferred. Quaternary "oxides" containing three metals and oxygen or oxides containing even a greater number of metals with, optionally, fluorine substitution for part of the oxygen are also usable.

The replacement of oxygen atoms by fluorine atoms from sulfur tetrafluoride can take place in several ways. In perhaps the simplest and most obvious, the oxygen in the inorganic oxide is merely replaced by the fluorine without valence change in any of the elements involved. Such simple replacement is illustrated by the reaction of titanium dioxide as follows:

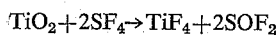
$$TiO_2 + 2SF_4 \rightarrow TiF_4 + 2SOF_2$$

Numerous other binary fluorides can be obtained in this manner as will be evident hereinafter.

Partial replacement of the oxygen may also occur in some instances to yield the oxyfluorides, e.g.,

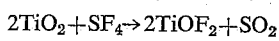
$$2TiO_2 + SF_4 \rightarrow 2TiOF_2 + SO_2$$

Oxides of polyvalent metals tend to form the oxyfluorides under relatively mild reaction conditions. These oxyfluorides can themselves be changed to completely fluorinated compounds under more stringent conditions than are required for their synthesis:

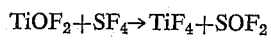
$$TiOF_2 + SF_4 \rightarrow TiF_4 + SOF_2$$

Conditions which must be intensified to produce the binary fluorides rather than the oxyfluorides are, in general, the conventional ones, i.e., concentration, temperature, pressure, contact time, and the like. Compare Examples 6A and 6B below for the results obtained with a change in conditions.

Sometimes the fluorination reaction is accomplished by a valence change in the sulfur. Reduction of the sulfur tetrafluoride to yield elemental sulfur as a by-product may occur, as illustrated with niobium oxide:

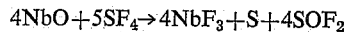
$$4NbO + 5SF_4 \rightarrow 4NbF_3 + S + 4SOF_2$$

In other cases, the reaction is accomplished by oxidation of the sulfur tretrafluoride. For example, the reaction with chromium oxide ($CrO_3$) yields, in addition to solid chromium fluorides, sulfur hexafluoride ($SF_6$), thionyl tetrafluoride ($SOF_4$), sulfuryl fluoride ($SO_2F_2$) and thionyl fluoride ($SOF_2$). Sodium peroxide yields, in addition to sodium fluoride, thionyl tetrafluoride, sulfur hexafluoride and sulfuryl fluoride.

In addition to the products of direct reaction noted above, that is, simple fluorides, oxyfluorides, and various sulfur products, some inorganic fluorides form adducts or addition compounds with sulfur tetrafluoride. These fluorides may, accordingly, be isolated as these products, germanium, isolated as $GeF_4.2SF_4$, providing an example. There may also be present in the reaction mixture compounds which react with the inorganic fluorides as they are formed to yield complex fluorides. For example, sodium fluoride or potassium fluoride when present in the reaction of aluminum oxide with sulfur tetrafluoride will combine with the aluminum fluoride as it is formed to yield $NaAlF_4$ or $KAlF_4$.

Sulfur tetrafluoride, which is used as the fluorinating agent, can be prepared by methods described in the literature (Brown and Robinson, J. Chem. Soc. 1955, 3147–51).

The reaction of the metal oxide with sulfur tetrafluoride is conducted under substantially anhydrous conditions in either a batch or continuous flow process. In either process the reaction chamber is preferably made of material resistant to chemical attack by hydrogen fluoride, for example, stainless steel or platinum. In a batch process, a vessel capable of withstanding pressure is preferably flushed with an inert gas, for example, nitrogen to displace the air and is then charged with the inorganic oxide. The chamber is cooled, evacuated and sulfur tetrafluoride then added to the cooled chamber.

The ratios in which the reactants are used is not critical but for maximum yield of product the sulfur tetrafluoride is preferably used in excess. The molar ratio of sulfur tetrafluoride to metal oxide will be determined, in part, by the number of oxygen atoms present in the oxide. Generally, at least one-half mole of sulfur tetrafluoride is used for each atom of oxygen to be replaced. The quantity of sulfur tetrafluoride can, however, range from 0.1 mole to 20 moles for each atom of oxygen present in the metal oxide.

The temperature of the reaction is kept as low as operability permits and preferably lies between about 20° C. and about 500° C. although higher temperatures can be used. The pressure employed is generally autogenous and can lie between about 5 atmospheres and 50 atmospheres. The reaction time for a batch process is between about 2 hours and about 40 hours. During the reaction period, the contents of the reaction vessel are preferably mixed, for example, by mechanical stirring or shaking.

The process of the invention can be conducted by a continuous flow method wherein the metal oxide is placed in a tube of corrosion-resistant material. The tube and contents are preferably heated to insure complete removal of moisture and then cooled. Sulfur tetrafluoride gas is then passed through the tube which is heated to a temperature sufficient to cause reaction of the oxide with the tetrafluoride gas. Volatile products are collected in traps cooled with, for example, solid carbon dioxide-acetone solution or liquid nitrogen.

The following nonlimiting examples illustrate the process of this invention.

*Example 1.—Calcium fluoride*

A pressure vessel of 145 ml. capacity, lined with stainless steel, was charged with 11.2 g. (0.20 mole) of calcium oxide, cooled in a solid carbon dioxide-acetone solution, evacuated to 1 mm. pressure and charged with 66 g. (0.60 mole) of sulfur tetrafluoride. The sealed vessel was heated at 100° C. for 2 hours, 200° C. for 4 hours, and finally at 300° C. for 8 hours. After cooling and venting the bomb to reduce the pressure to atmospheric, there was obtained 10.6 g. of a white solid which was shown by X-ray analysis to be calcium fluoride, $CaF_2$.

Sodium and potassium fluorides can be prepared similarly by reaction of the peroxides with sulfur tetrafluoride at about −37 to +50° C. for from 1 to 4 hours. Barium fluoride and strontium fluoride can be prepared as described in Example 1 by employing barium and strontium oxides.

*Example 2.—Mercuric fluoride*

Using the bomb and process as described in Example 1, 21.6 g. (0.10 mole) of mercuric oxide and 44 g. (0.40 mole) of sulfur tetrafluoride were heated at 80° C. for 2 hours, and at 150° C. for 8 hours. There was obtained 15.9 g. of a pale-salmon colored solid which was shown by X-ray diffraction and elemental analyses to be mercuric fluoride, $HgF_2$.

*Analysis.*—Calc'd for $HgF_2$: F, 15.8%. Found: F, 13.49%; 13.99%.

*Example 3.—Zinc fluoride*

A tube of borosilicate glass ("Pyrex"), 1 foot long and approximately 1 inch in diameter, was charged with an equal molar mixture of zinc oxide-zinc chromite containing approximately 0.2 mole of zinc chromate. The charged tube was heated in an electric furnace to 250° C. and a stream of nitrogen gas passed through to assure removal of all moisture. After cooling, the inlet end of the tube was attached to a cylinder of sulfur tetrafluoride; the exit gases were passed through traps cooled respectively with ice and a solid carbon dioxide-acetone mixture. Sulfur tetrafluoride was passed for 6 hours through the tube which was heated to 150–200° C. The product in the tube was white and consisted of a molar mixture of zinc fluoride and zinc chromite, and 0.2 mole of zinc chromate.

The above examples illustrate the reaction as applied to oxides of metals of groups I–A, I–B, II–A and II–B.

*Example 4.—Lanthanum fluoride*

Using the bomb and process as described in Example 1, a mixture of 48.9 g. (0.15 mole) of lanthanum oxide ($La_2O_3$) and 99 g. of sulfur tetrafluoride (0.90 mole) was heated at 100° C. for 2 hours, 200° C. for 2 hours, 300° C. for 4 hours, and 350° C. for 6 hours. There was obtained 46.7 g. of lanthanum fluoride, $LaF_3$, a colorless solid, whose composition was confirmed by X-ray diffraction.

*Example 5.—Cerium fluoride*

Using the bomb and process as described in Example 1, a mixture of 34.4 g. (0.20 mole) of cerium oxide ($CeO_2$) and 63 g. (0.60 mole) of sulfur tetrafluoride was heated at 100° C. for 2 hours and at temperature ranges of 100 128° C. for ½ hours. At this point, the run flashed from 135 to 180° C. and the bomb was not heated further. The volatile product, weighing 54.3 g., was transferred to a cylinder cooled in liquid nitrogen. This material contained 4 to 5% of sulfuryl fluoride ($SO_2F_2$), 0.5 mole percent of sulfur hexafluoride ($SF_6$), and a trace of thionyl tetrafluoride ($SOF_4$). There was also present 40–45 mole percent of thionyl fluoride ($SOF_2$). The solid reaction product left in the tube weighed 34 g. and was shown by X-ray analysis to contain cerium fluoride ($CeF_3$).

Using the process as described in Example 5, aluminum fluoride ($AlF_3$) can be prepared from aluminum oxide; thallium fluoride ($TlF_3$) from thallium oxide and scandium fluoride ($ScF_3$) from scandium oxide.

The above example illustrate the process as applied to oxides of metals of groups III–A and III–B, including the lanthanum series.

Example 6.—Titanium oxyfluoride and tetrafluoride

A. A process similar to that described in Example 3 was used. The glass reactor was charged with 20 g. of titanium dioxide following which sulfur tetrafluoride gas was passed through the oxide at about 25° C. The temperature of the oxide rose momentarily to 76° C. but then dropped. The reactor was heated to 105° C. and sulfur tetrafluoride gas again passed through the oxide, the temperature rose to 167° C. and then dropped to 115° C. The reactor was heated to 268° C. at which temperature the oxide reacted rapidly and exothermically with sulfur tetrafluoride, the temperature rising rapidly to 424° C. A total of 38.5 g. of sulfur tetrafluoride was passed through the tube during the 33 minutes of operation. There was obtained 20.1 g. of a white solid which was shown by X-ray diffraction to be titanium oxyfluoride, $TiOF_2$.

B. Using the bomb and process as described in Example 1, 20.0 g. (0.25 mole) of titanium dioxide and 81 g. (0.75 mole) of sulfur tetrafluoride were heated at 100° C. for 2 hours, 200° C. for 2 hours, and at 300° C. for 10 hours. A grayish-white solid, weighing 32.8 g., was obtained which contained titanium tetrafluoride. There was present in the solid 43.77% fluorine.

C. In another run 12.0 g. (0.15 mole) of titanium dioxide and 97 g. (0.90 mole) of sulfur tetrafluoride were heated as described in B. There was obtained 17.9 g. of solid titanium tetrafluoride. The solid contained 61.79% F.

Example 7.—Germanium tetrafluoride

Using the bomb and process described in Example 1, a mixture of 7.8 g. (0.75 mole) of germanium dioxide and 66 g. (0.60 mole) of sulfur tetrafluoride was heated at 100° C. for 2 hours, 200° C. for 4 hours, and 300° C. for 8 hours. A white crystalline solid, weighing 16.5 g., was recovered from the cylinder. The product was the adduct of sulfur tetrafluoride and germanium fluoride with the formula $GeF_4 \cdot 2SF_4$. It fumed in air but was stable at ordinary temperature when stored in a bottle made of polytetrafluoroethylene.

Analysis.—Calc'd for $GeF_4 \cdot 2SF_4$: F, 62.6%; S, 17.5%. Found: F, 64.12%; S, 18.51%.

Example 8.—Lead fluoride

Using the bomb and process described in Example 1, a mixture of 35.9 g. (0.15 mole) of lead dioxide and 46 g. (0.42 mole) of sulfur tetrafluoride was heated at 100° C. for 2 hours, 200° C. for 4 hours, and 300° C. for 6 hours. There was obtained 31.5 g. of a white crystalline solid which consisted largely of lead fluoride ($PbF_2$).

Analysis.—Calc'd for $PbF_2$: F, 15.5%; Pb, 84.5%. Found: F, 12.16%; Pb, 81.27%, 82.20%.

Examples 6 through 8 illustrate the process as applied to oxides of metals of groups IV-A and IV-B.

Example 9.—Niobium trifluoride

Using the bomb and process as described in Example 1, a mixture of 21 g. (0.19 mole) of niobium monoxide and 52.7 g. (0.50 mole) of sulfur tetrafluoride was reacted at 100° C. for 2 hours, 200° C. for 2 hours, 300° C. for 4 hours, and 400° C. for 6 hours. A fluffy heterogeneous brown solid, weighing 12.0 g., was obtained which was shown by X-ray analysis to contain niobium trifluoride ($NbF_3$).

Example 10.—Bismuth trifluoride

Using the bomb and process as described in Example 1, a mixture of 46.6 g. (0.10 mole) of bismuth oxide ($Bi_2O_3$) and 66 g. (0.60 mole) of sulfur tetrafluoride was heated at 100 C. for 2 hours, 200° C. for 4 hours, and 300° C. for 6 hours. There was obtained 42.0 g. of $BiF_3$, a light gray solid.

Analysis.—Calc'd for $BiF_3$: F, 21.4%; Bi, 78.7%. Found: F, 20.67%; Bi, 78.77%, 79.05%.

Examples IX and X illustrate the process as applied to the oxides of metals of groups V-A and V-B. By the process, vanadium fluorides can be prepared from vanadium oxides, tantalum fluorides from tantalum oxides and antimony fluorides from antimony oxides.

Example 11.—Chromium fluorides

A. A run was made as described in Example 1 in which a mixture of 20.0 g. (0.20 mole) of chromium trioxide ($CrO_3$) and 88.0 g. (0.80 mole) of sulfur tetrafluoride was heated at 100° C. for 2 hours, 200° C. for 4 hours, and 300° C. for 6 hours. There was obtained 23.0 g. of a solid product which was a mixture of chromium fluorides and which analyzed as follows: F, 60.50%; Cr, 37.12%; S, 3.89%. Analysis of the volatile products obtained in a duplicate run and weighing 76.2 g. showed the following compounds to be present: thionyl tetrafluoride ($SOF_4$) in approximately 25% yield, sulfur hexafluoride ($SF_6$) in approximately 46% yield and sulfuryl fluoride ($SO_2F_2$) in approximately 23% yield. Sulfur tetrafluoride and thionyl fluoride were also present.

B. Using the bomb and process as described in Example 1, a mixture of 16.2 g. (0.10 mole) of sodium chromate and 38.5 g. (0.35 mole) of sulfur tetrafluoride was heated as described in Part A. There was obtained 18.8 g. of a pale green solid which was a mixture of chromium fluorides and which analyzed as follows: F, 43.48%; S, 3.18%. The volatile product, weighing 34.0 g., was shown by mass spectrometric analysis to be thionyl tetrafluoride ($SOF_4$, 4.10 mole percent), sulfur hexafluoride ($SF_6$, 0.3–0.4 mole percent), sulfuryl fluoride ($SO_2F_2$, 7–8.5 mole percent) with small quantities of thionyl fluoride ($SOF_2$) and unreacted sulfur tetrafluoride.

Example 12.—Molybdenum hexafluoride

Using the bomb and process as described in Example 1, a mixture of 14.4 g. (0.10 mole) of molybdenum oxide ($MoO_3$) and 66 g. (0.60 mole) of sulfur tetrafluoride was heated at 70° C. for 2 hours and 350° C. for 7 hours. A volatile reaction product weighing 67.5 g. was obtained which was shown by infrared analysis to contain principally molybdenum hexafluoride ($MoF_6$). There was also present hydrogen fluoride, thionyl fluoride and unreacted sulfur tetrafluoride. There was no unreacted molybdenum oxide remaining in the bomb.

Example 13.—Tungsten hexafluoride

Using the bomb and process of Example 1, a mixture of 23.2 g. (0.10 mole) of tungsten oxide ($WO_3$) and 66 g. (0.60 mole) of sulfur tetrafluoride was heated at 350° C. for 10 hours. The reaction was mildly exothermic. The volatile reaction product, which was collected in a cylinder cooled with liquid nitrogen, weighed 87.5 g. The cylinder was vented until the rate of gas evolution dropped markedly; the product remaining in the cylinder was shown by infrared analysis to be 70% tungsten hexafluoride ($WF_6$).

Example 14.—Nickel-molybdenum oxyfluorides

A. Using the reactor and process of Example 3, sulfur tetrafluoride was reacted in a continuous flow system with nickel molybdate ($NiMoO_4$) at 100–150° C. There was obtained as a solid product in the reaction tube a mixture of nickel difluorooxymolybdate ($NiMoO_3F_2$) and nickel tetrafluorooxymolybdate ($NiMoO_2F_4$). The product contained 20.43% fluorine.

B. The reactor of Part A above was charged with nickel molybdite ($NiMoO_2$) and sulfur tetrafluoride passed through the tube at 100–150° C. A solid product was obtained whose analysis showed that it was nickel difluorooxymolybdate ($NiMoO_3F_2$).

Analysis.—Calc'd for $NiMoO_3F_2$: F, 15.80%. Found: F, 16.82%.

Examples 11 through 14 illustrate the application of the process to oxides of metals of group VI–B.

Example 15.—Manganese fluoride

Using the bomb and process as described in Example 1, 13.0 g. (0.15 mole) of manganese dioxide and 66.0 g. (0.60 mole) of sulfur tetrafluoride was heated at 300° C. for 2 hours and 350° C. for 12 hours. There was obtained a solid reaction product which weighed 12.0 g. and contained 27.03% fluorine. It was shown by X-ray analysis to be a mixture of manganese fluoride ($MnF_2$) and manganese dioxide.

Example 16.—Chromium oxyfluoride

Using the continuous flow process described in Example 3, sulfur tetrafluoride was reacted at 200–260° C. with chromium manganite containing an excess of $MnO_2$, i.e., $(Cr_2Mn_3O_9) \cdot 0.56MnO_2$. There was obtained the volatile chromium oxyfluoride, $CrO_2F_2$, and a solid product that contained 34.04% Mn, 13.40% Cr, and 15.95% F.

Examples 15 and 16 illustrate the application of the process to oxides of metals of group VII–B.

Example 17.—Ternary fluorides

Using the bomb and process described in Example 1, 8.6 g. (0.20 mole) of sodium fluoride, 23.2 g. (0.10 mole) of tungsten oxide ($WO_3$) and 66 g. (0.60 mole) of $SF_4$ was heated at 250° C. for 8 hours. A grayish-white solid, weighing 26.1 g., was recovered from the bomb whose analysis showed that it was $Na_2WF_8$.

*Analysis.*—Calc'd for $Na_2WF_8$: W, 48.2%; F, 39.8%. Found: W, 46.8%; F, 38.4%.

The process of this invention, when applied to the oxides of the elements of group VIII yields the fluorides of the elements. For example, iron oxide yields ferric fluoride ($FeF_3$), cobalt oxide yields cobaltous fluoride ($CoF_2$), and nickel oxide yields nickelous fluoride ($NiF_2$).

The preceding examples illustrate the process of the invention as it applies to relatively pure oxides or mixed oxides. It can also be applied to naturally occurring oxides as they are found in minerals and ores, for example, bauxite, ilmenite, rutile, chromite, magnetite, manganosite, and beryl.

Since obvious modifications in the invention will be evident to those skilled in the chemical arts, I propose to be bound solely by the appended claims.

The embodiments of the invention in which an exclusive property or privilege is claimed are defined as follows:

1. The process of producing at least one member of the group consisting of the fluorides and oxyfluorides of a metal having an atomic number not greater than 83 which comprises reacting sulfur tetrafluoride under substantially anhydrous conditions with a compound consisting of (1) at least one metal having an atomic number not greater than 83, (2) oxygen, and (3) at most one other nonmetal, that nonmetal being fluorine.

2. The invention of claim 1 in which the reaction temperature is about 20–500° C.

3. The process of producing at least one member of the group consisting of the fluorides and oxyfluorides of a metal having an atomic number not greater than 83 which comprises reacting sulfur tetrafluoride under substantially anhydrous conditions with a binary oxide of a metal having an atomic number no greater than 83.

4. The invention of claim 3 in which the binary oxide is that of a metal which has an atomic number between 22 and 51, inclusive, and which is chosen from one of the groups IV–A, V–A, IV–B, V–B, VI–B, VII–B and VIII of the periodic table.

5. The process of producing at least one member of the group consisting of the fluorides and oxyfluorides of a metal having an atomic number not greater than 83 which comprises reacting sulfur tetrafluoride under substantially anhydrous conditions with a ternary oxide consisting of oxygen and two metals, each of which has an atomic number no greater than 83.

6. The invention of claim 5 in which at least one of said metals is a member of the group consisting of alkali and alkaline earth metals.

7. The process of preparing at least one member of the group consisting of titanium tetrafluoride and titanium oxyfluoride which comprises reacting sulfur tetrafluoride with titanium dioxide under substantially anhydrous conditions.

8. The process of preparing niobium trifluoride which comprises reacting sulfur tetrafluoride with niobium monoxide under substantially anhydrous conditions.

9. The process of preparing a chromium fluoride which comprises reacting sulfur tetrafluoride with at least one member of the group consisting of the binary and ternary oxides of chromium under substantially anhydrous conditions.

10. The process of preparing an inorganic compound containing molybdenum and fluorine which comprises reacting sulfur tetrafluoride with at least one member of the group consisting of the binary and ternary oxides of molybdenum under substantially anhydrous conditions.

11. The process of preparing tungsten hexafluoride which comprises reacting sulfur tetrafluoride with tungsten oxide under substantially anhydrous conditions.

12. The process of preparing lead fluoride which comprises reacting sulfur tetrafluoride with lead dioxide under substantially anhydrous conditions.

13. The process of preparing cerium fluoride which comprises reacting sulfur tetrafluoride and cerium oxide under substantially anhydrous conditions.

References Cited in the file of this patent

Chem. Abstracts, vol. 42, p. 51C (1948), abstracted from the J. Gen. Chem (USSR) 17, 185–92 (1947).

Journal of the Chem. Society (London), 1956, Part I, page 785 (March 1956).

Ind. and Eng. Chem., vol. 42, No. 11, November 1950, p. 2224, left col.

Hampel: "Rare Metals Handbook," pp. 405–17 (particularly pages 410, 413), published 1954 by Reinhold Publ. Corp., N.Y.